United States Patent
Mili

(10) Patent No.: US 9,729,029 B2
(45) Date of Patent: Aug. 8, 2017

(54) INTERFERENCE SUPPRESSION DEVICE

(71) Applicant: Robert Bosch GmbH, Stuttgart (DE)

(72) Inventor: Tarek Mili, Lauterbourg (FR)

(73) Assignee: Robert Bosch GmbH, Stuttgart (DE)

( * ) Notice: Subject to any disclaimer, the term of this patent is extended or adjusted under 35 U.S.C. 154(b) by 471 days.

(21) Appl. No.: 14/532,267

(22) Filed: Nov. 4, 2014

(65) Prior Publication Data

US 2015/0123504 A1 May 7, 2015

(30) Foreign Application Priority Data

Nov. 4, 2013 (DE) .................. 10 2013 222 336

(51) Int. Cl.
- *H02K 11/00* (2016.01)
- *H02K 11/026* (2016.01)
- *H02K 11/02* (2016.01)

(52) U.S. Cl.
CPC ......... *H02K 11/026* (2013.01); *H02K 11/024* (2013.01)

(58) Field of Classification Search
CPC ...... H02K 11/026; H02K 11/02; H02K 11/40; H02K 5/225
USPC ............................... 310/71–72, 51
See application file for complete search history.

(56) References Cited

U.S. PATENT DOCUMENTS

| 4,384,223 A * | 5/1983 | Zelt .................. H02K 5/225 310/68 R |
| 5,281,876 A | 1/1994 | Sato |
| 2002/0030414 A1 | 3/2002 | Mizutani et al. |
| 2007/0278877 A1* | 12/2007 | Winkler ............... H02K 11/026 310/72 |
| 2010/0117469 A1* | 5/2010 | Niederer ............... H02K 11/40 310/71 |
| 2010/0181853 A1* | 7/2010 | Wong ................ H02K 5/225 310/72 |
| 2011/0095630 A1* | 4/2011 | Jiang ................. H02K 5/148 310/72 |
| 2015/0028705 A1* | 1/2015 | Yamaguchi ........ H02K 11/026 310/72 |

FOREIGN PATENT DOCUMENTS

| DE | 10144918 | 3/2002 |
| DE | 10154673 | 5/2003 |

* cited by examiner

*Primary Examiner* — Thanh Lam
(74) *Attorney, Agent, or Firm* — Michael Best & Friedrich LLP

(57) ABSTRACT

An interference suppression device (100) for an electric machine (1), wherein at least a subregion of a spring element (25), together with a region (38) of a section (17; 17a, 17b) which makes contact with a housing element (18), is arranged in a radial gap (40) between a component part (1) and the housing element (18).

18 Claims, 3 Drawing Sheets

INTERFERENCE SUPPRESSION DEVICE

BACKGROUND OF THE INVENTION

The invention relates to an interference suppression device for an electric machine, in particular in the form of an electric motor. In addition, the invention relates to an electric motor comprising an interference suppression device according to the invention and to the use of an electric motor.

An interference suppression device is already known in practice. It is part of an electric motor provided with (carbon) brushes in a comfort drive in a motor vehicle and is used for improving or ensuring the electromagnetic compatibility (EMC) of the electric motor. The known interference suppression device in this case comprises two Cy interference suppression capacitors in the case of a 2-pole electric motor, which capacitors are firstly electrically conductively connected to the two power supply lines (carbon brushes) of the electric motor and secondly electrically conductively connected to a ground potential. The interference suppression capacitors are arranged in the region of a brushholder plate consisting of plastics, wherein the wire of the interference suppression capacitor which is used for the connection to ground is arranged such that it is operatively connected to a spring element, which presses the wire against the metal housing (pole pot housing) of the electric motor so as to form a pretensioning force.

It is important for such a connection to ground between an interference suppression element and, for example, the metal housing of the electric motor that, firstly a relatively low contact resistance is achieved and, secondly, a particularly robust and reliable connection which does not change over the operating life of the electric motor is provided.

One disadvantage with the prior art described above consists in that the spring element is fastened to the component part (brushholder plate) only on one side or at one end region, and the level of pretensioning force on the wire of the interference suppression capacitor therefore can only be set or is controllable with relative difficulty. As a result, in particular the mentioned reliable connection to ground of the interference suppression element is not reliably ensured over the life of the electric machine.

Furthermore, further solutions are known from the prior art in which a spring element in the form of a grounding spring is inserted, for example, into a ring-shaped gap between a brushholder plate and the pole pot housing of the electric motor in a manner which is clearly defined, wherein the interference suppression element is connected with its wire to the grounding spring by means of a welded joint. Such a solution is satisfactory in terms of its function, even when considered over the life of the electric motor, but the formation of the welded joint requires increased complexity in terms of installation and manufacturing. A solution is also known in which the interference suppression capacitor is received in clamping fashion with its electrically conductive wire directly between the brushholder body and the pole pot housing. One disadvantage here consists in that owing to the material (plastics) of the brushholder plate which has a relatively high level of elasticity, it is not possible to achieve a clearly defined press-in force, in particular in the case of temperature fluctuations, as result of which the contact resistance can change markedly in the event of temperature fluctuations, with the result that functioning is not ensured.

SUMMARY OF THE INVENTION

Against the background of the prior art illustrated, the invention is based on the object of forming an interference suppression device for an electric machine such that, firstly, a particularly robust and reliable connection to ground of the interference suppression element to a metal housing is enabled and that this connection can furthermore be produced in a particularly simple manner. This object is achieved according to the invention in the case of an interference suppression device for an electric machine in that at least a subregion of the spring element, together with that region of the section of the interference suppression element which makes contact with the housing element (pole pot housing), is arranged in a radial gap between the component part and the housing element. Such a design enables a mechanically reliable, reproducible contact-pressure force of the electrically conductive region of the interference suppression element throughout the operating life of the electric machine and furthermore in particular does not require any additional connection between the component parts (welded joint) than in the prior art, apart from the fitting of the mentioned component parts.

A geometrically clear arrangement of the spring element in the gap or ring-shaped gap between the component part (brushholder plate) and the housing element (pole pot housing) with constantly the same pretensioning force of the spring element is achieved when the spring element is deformed elastically by two supporting sections bearing against the component part and when that region of the section which bears against the housing part is arranged between the supporting sections.

In a preferred configuration of the interference suppression device, it is provided that the spring element is not electrically connected to the machine apart from being electrically connected to the electrically conductive section of the interference suppression element. As a result, electrically constant conditions or contact resistances at the interference suppression element are always produced throughout the operating life of the electric machine, with these conditions and contact resistances in particular not being dependent on the electrical properties of the spring element.

In a preferred design configuration of the spring element, said spring element is formed as a stamped and bent part in the form of a spring metal sheet. Such a spring element can be produced relatively simply and makes it possible to adapt said spring element to the respective application case or to the geometry of the component parts in a particularly simple manner and for said spring element to be connected or operatively connected to the component parts.

For the defined positioning of the electrically conductive section of the interference suppression element, it is particularly advantageous if the spring metal sheet has a guide slot, in which the electrically conductive section of the interference suppression element is guided regionally.

In one configuration of the spring element which is preferred in design terms, it is furthermore provided that the spring element has a deformation section, against which the electrically conductive region of the section bears on the side facing the housing, and that the deformation section is arranged between the supporting sections.

In particular, it is provided that the component part is a brushholder element. Thus, it is possible for the interference suppression element to be connected to the housing (pole pot) with said elements physically close to one another.

In order to fasten the spring metal sheet, it is provided that said spring metal sheet is connected to the component part (brushholder plate) by means of a clamping or latching connection. Such fastening is particularly advantageous because no separate fastening elements such as screws or the like are required, which would otherwise result in increased complexity in terms of installation.

In particular, it may be provided in this case that the spring metal sheet has a substantially U-shaped holding section, which engages around a holding region of the component part in a form-fitting and force-fitting manner. Such a connection enables fastening of the spring metal sheet to the component part (brushholder plate) over a large area and in a reliable manner.

An electric machine generally requires, depending on the pole number of said electric machine, at least two interference suppression elements. In order to enable particularly simple fastening of the interference suppression elements using a small number of parts, it is provided that the spring metal sheet is designed to accommodate a plurality of sections of interference suppression elements. In other words, this means that a single spring metal sheet is used, for example, for the connection to ground of two interference suppression capacitors to the housing of the electric motor.

Preferably, the interference suppression means is in the form of a Cy capacitor. As an alternative to this, however, other interference suppression elements such as, for example, inductors, Cx capacitors, varistors or the like are also conceivable.

Such robust and particularly safe connections to the ground are suitable in particular for 4-pole electric motors, in addition to the conventional 2-pole electric motors, since in such applications there are increased requirements in respect of EMC.

Preferred is the use of such an electric motor as part of a comfort drive in a motor vehicle. In this case, such a comfort drive is intended to mean in particular, but not in a restrictive manner, a window regulator drive, a seat adjustment drive, a sunroof drive or the like.

BRIEF DESCRIPTION OF THE DRAWINGS

Further advantages, features and details of the invention result from the description below relating to preferred exemplary embodiments and with reference to the drawing, in which.

Identical elements or elements with an identical function have been provided with the same reference numerals in the figures.

DETAILED DESCRIPTION

Figure 1:
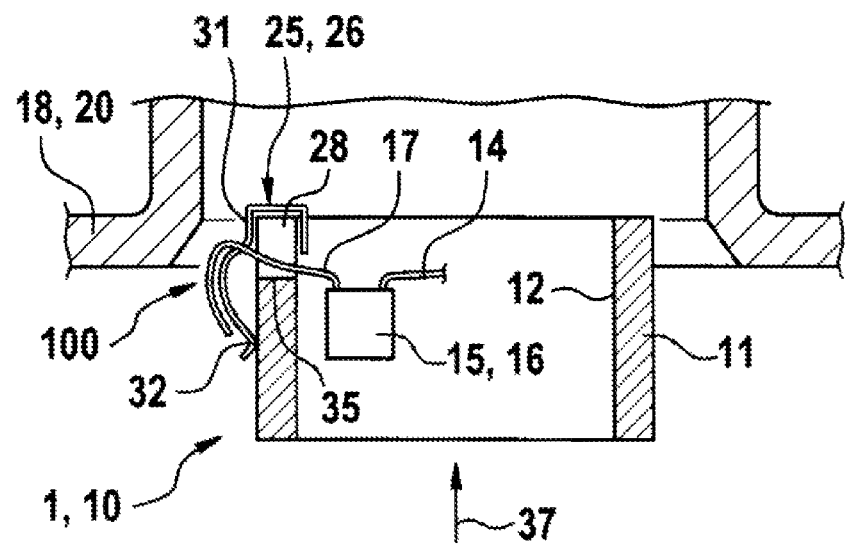
FIG. 1 shows a simplified illustration of the connecting region between a connection wire of a Cy capacitor and a metal housing using a spring element before the connection wire of the capacitor is in electrically conductive contact with the housing.

FIG. 1 illustrates a subregion of an electric machine 1 in the form of an electric motor 10, which is in particular part of a comfort drive in a motor vehicle. The illustrated detail of the electric motor 10, which is in the form of a brushed electric motor 10, shows, in very simplified form, a plastics brushholder element in the form of a plastics brushholder plate 11 with an aperture 12 for passing through an armature shaft (not shown), wherein a (carbon) brush (likewise not illustrated) is electrically conductively connected to an interference suppression means 15 in the form of a Cy capacitor 16. The Cy capacitor 16 has two connection wires 14, 17, of which one connection wire 14 is electrically connected to the brush, while the other connection wire 17 is provided for connection to ground to a metal housing element 18 in the form of a pole pot housing 20 consisting of sheet metal. The interference suppression means 15 is, together with a spring element 25, part of an interference suppression device 100 according to the invention, which serves the purpose of electrically conductively connecting the connection wire 17 to the pole pot housing 20.

Additionally, it is mentioned that only a single interference suppression means 15 in the form of the Cy capacitor 16 is illustrated in FIG. 1. Generally, each brush of the electric motor 10 has a separate such interference suppression means 15, however.

Figure 2:
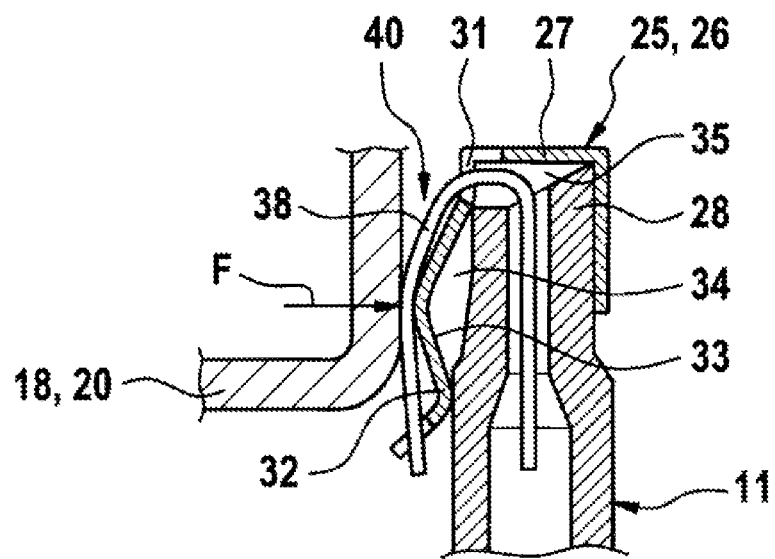
FIG. 2 shows a detail from FIG. 1 with the connection wire of the capacitor bearing against the housing, and FIG. 3 to FIG. 5 each show perspective views of differently designed spring elements or connections to ground of capacitor wires.

The spring element 25 is formed as a stamped and bent part in the form of a spring metal sheet 26, which, corresponding to the illustration in particular in FIGS. 1 and 2, has a holding section 27 which is U-shaped in cross section and which engages around a radially circumferential holding region 28, in the form of a web, of the brushholder plate 11, with the result that the holding section 27 forms a clamping connection with the holding region 28, for example. Alternatively, it is also conceivable for the spring metal sheet 26 to have latching openings, for example, which interact with corresponding latching cams on the brushholder element 11 so as to form a latching connection. On that side facing the pole pot housing 20 which concentrically surrounds the (round) brushholder plate 11, the spring metal sheet 26 has two supporting sections 31, 32, which bear against the outer circumference of the brushholder plate 11. A curved deformation section 33 is provided between the two supporting sections 31, 32, with the result that a gap 34 is formed between the deformation section 33 and the brushholder plate 11, wherein the size of the gap 34 is dependent on the degree of deformation force F acting on the deformation section 33. The connection wire 17 of the Cy capacitor 16 is passed through an opening 35 in the brushholder plate 11 and enters a longitudinal slot 36 in the spring metal sheet 26, which longitudinal slot can be seen in particular in FIGS. 3 and 4. Furthermore, the connection wire 17 is guided in the region of the spring metal sheet 26 in such a way that said connection wire bears against the deformation section 33 from the outside on the side facing the pole pot housing 20 and is guided in the direction of the supporting section 32, where the connection wire 17 ends.

The elastic deformation force F on the deformation section 33 of the spring metal sheet 26 is caused during fitting of the brushholder plate 11 in the direction of the arrow 37 when the brushholder element 11 and the pole pot housing 20 move with respect to one another. In this case, that region 38 of the connection wire 17 which is arranged in the region of the deformation section 33 comes into electrically conductive contact with the pole pot housing 20, which is electrically connected to ground potential, wherein at the same time the deformation section 33 is elastically deformed so as to reduce the size of the gap 34. In the installed state of the brushholder plate 11, said brushholder plate is located, at least with a subregion of the spring metal sheet 26, at least approximately, preferably completely, axially in the region of the pole pot housing 20 and within a gap in the form of a ring-shaped gap 40 between the brushholder plate 11 and the pole pot housing 20. In order to make it possible for the connection wire 17 to bear against the (inner) wall of the pole pot housing 20 and therefore for the elastic deformation force F to be produced, it is necessary for at least the connection wire 17, but preferably also the spring metal sheet 26, to protrude radially beyond the brushholder plate 11 in such a way that said connection wire and spring metal sheet reach over the inner diameter of the pole pot housing 20 (when the brushholder plate 11 is not fitted).

Figure 3:
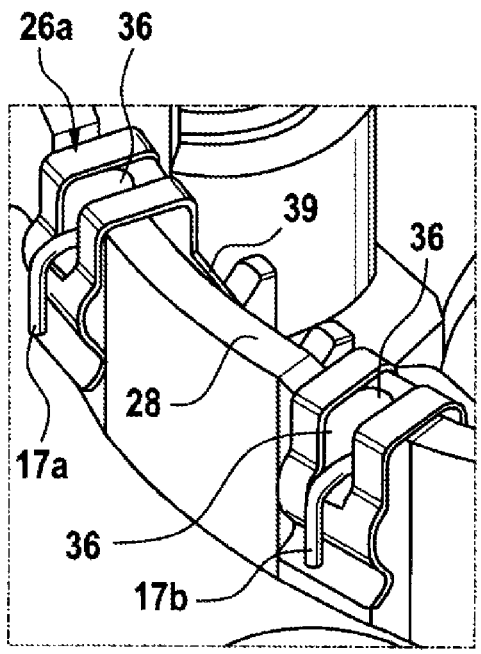
Figure 4:
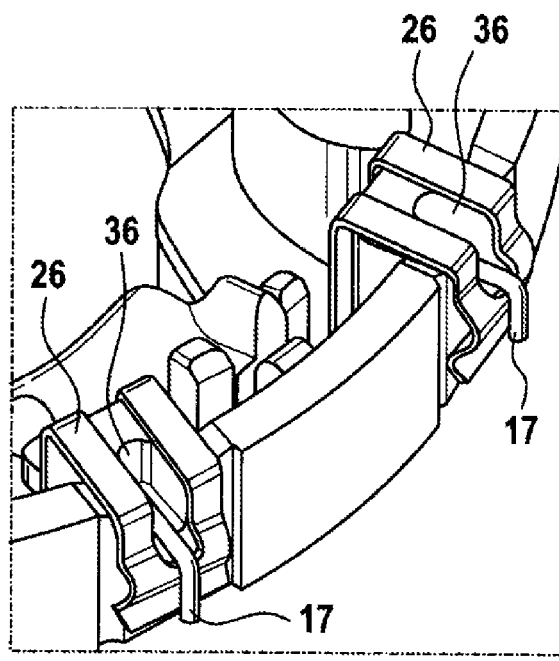
Figure 5:
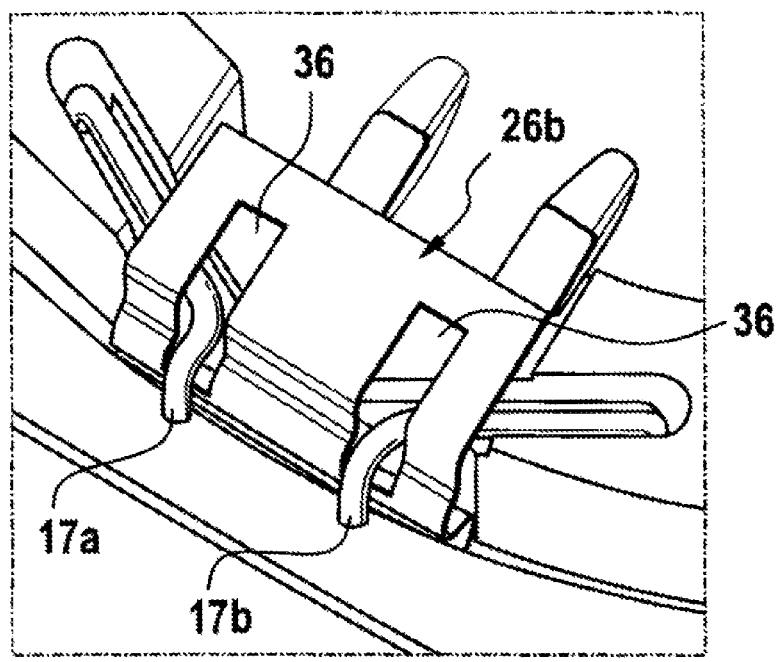

FIG. 3 illustrates a spring metal sheet 26a which consists of two spring metal sheets 26 illustrated corresponding to FIGS. 1 and 2, which spring metal sheets are connected to one another via a connecting section 39, which is only partially visible in FIG. 3 and which is guided radially within the holding region 28, with the result that such a spring metal sheet 26a is suitable for accommodating or fastening two connection wires 17a, 17b of second interference suppression elements 15. FIG. 4, on the other hand, shows the use of two separate spring metal sheets 26, which are each used for fastening a connection wire 17 of an interference suppression means 15. Finally, FIG. 5 illustrates a further modified spring metal sheet 26b, which has two longitudinal slots 36 arranged parallel to one another for accommodating in each case one connection wire 17a, 17b.

The interference suppression device 100 described to this extent can be modified or developed in a variety of ways without departing from the concept of the invention. In particular, it is conceivable to use such an interference suppression device 100 not only in electric motors, but in generators or similar electric machines, for example.

The invention claimed is:

1. An interference suppression device (100) for an electric machine (1), comprising at least one interference suppression element (15), which is fastened at least indirectly on a component part (11) of the machine (1), which component part consists of plastics, wherein the interference suppression element (15) bears with an electrically conductive section (17; 17a, 17b) against a housing element (18) consisting of metal so as to form a connection to ground by means of a spring element (25), and wherein the spring element (25), together with a region (38) of the section (17; 17a, 17b), which region makes contact with the housing element (18), is arranged in clamping fashion between the component part (11) of the machine (1) and the housing element (18) so as to form an elastic pretensioning force (F) of the spring element (25), wherein at least a subregion of the spring element (25), together with the region (38) of the section (17; 17a, 17b) which makes contact with the housing element (18), is arranged in a radial gap (40) between the component part (1) and the housing element (18).

2. The interference suppression device according to claim 1, characterized in that the spring element (25) is deformed elastically in the radial gap (40) by two supporting sections (31, 32) bearing against the component part (11), and in that that region (38) of the section (17; 17a, 17b) which bears against the housing part (18) is arranged between the supporting sections (31, 32).

3. The interference suppression device according to claim 1, characterized in that the spring element (25) is not electrically connected to the machine (1) apart from being electrically connected to the electrically conductive section (17; 17a, 17b) of the interference suppression element (15).

4. The interference suppression device according to claim 1, characterized in that the spring element (25) is formed as a stamped and bent part in the form of a spring metal sheet (26; 26a).

5. The interference suppression device according to claim 4, characterized in that the spring metal sheet (26; 26a) has a guide slot (36), in which the electrically conductive section (17; 17a, 17b) of the interference suppression element (15) is guided regionally.

6. The interference suppression device according to claim 1, characterized in that the spring element (25) has a deformation section (33), against which the electrically conductive region (17; 17a, 17b) bears regionally on a side facing the housing element (18), and in that the deformation section (33) is arranged between the supporting sections (31, 32).

7. The interference suppression device according to claim 1, characterized in that the component part (11) is a brushholder element in the form of a brushholder plate which is arranged transversely to a rotor shaft.

8. The interference suppression device according to claim 4, characterized in that the spring metal sheet (26; 26a) is connected to the component part (11) by means of a clamping or latching connection.

9. The interference suppression device according to claim 4, characterized in that the spring metal sheet (26, 26a) has a substantially U-shaped holding section (27), which engages around a holding region (28) of the component part (11) in a form-fitting manner.

10. The interference suppression device according to claim 4, characterized in that the spring metal sheet (26a) is designed to receive a plurality of sections (17a, 17b) of interference suppression elements (15).

11. The interference suppression device according to claim 4, characterized in that the spring metal sheet (26a) is designed to receive precisely two sections (17a, 17b) of interference suppression elements (15).

12. The interference suppression device according to claim 1, characterized in that the interference suppression means (15) is a Cy capacitor (16).

13. An electric machine, comprising an interference suppression device (100) according to claim 1.

14. An electric motor (10), comprising an interference suppression device (100) according to claim 1.

15. The electric motor according to claim 14, characterized in that the electric motor (10) is in the form of a four-pole electric motor (10).

16. A comfort drive in a motor vehicle, comprising an electric motor according to claim 14.

17. A window regulator drive in a motor vehicle, comprising an electric motor according to claim 14.

18. A sunroof drive in a motor vehicle, comprising an electric motor according to claim 14.

* * * * *